United States Patent
Itadani et al.

(10) Patent No.: US 9,581,200 B2
(45) Date of Patent: Feb. 28, 2017

(54) SLIDING PARTS

(71) Applicant: EAGLE INDUSTRY CO., LTD., Tokyo (JP)

(72) Inventors: Masatoshi Itadani, Tokyo (JP); Kazumasa Sunagawa, Tokyo (JP); Yuuichiro Tokunaga, Tokyo (JP); Ryoma Yamakawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 14/900,053

(22) PCT Filed: Sep. 25, 2014

(86) PCT No.: PCT/JP2014/075452
§ 371 (c)(1),
(2) Date: Dec. 18, 2015

(87) PCT Pub. No.: WO2015/046343
PCT Pub. Date: Apr. 2, 2015

(65) Prior Publication Data
US 2016/0195138 A1    Jul. 7, 2016

(30) Foreign Application Priority Data

Sep. 27, 2013   (JP) ................................ 2013-200677

(51) Int. Cl.
*F16J 15/34*       (2006.01)
*F16C 33/74*       (2006.01)

(52) U.S. Cl.
CPC ........... *F16C 33/74* (2013.01); *F16J 15/3412* (2013.01)

(58) Field of Classification Search
CPC .......... F16J 15/16; F16J 15/162; F16J 15/182; F16J 15/324; F16J 15/3244
See application file for complete search history.

(56) References Cited

U.S. PATENT DOCUMENTS 3,744,805 A * 7/1973 Heinrich .............. F16J 15/3412
                                                        277/400
5,498,007 A    3/1996 Kulkarni et al. ............ 277/96.1
(Continued)

FOREIGN PATENT DOCUMENTS

CN        101163910      4/2008       .............. F16J 15/34
CN        103097782      5/2013       .............. F16C 17/04
(Continued)

OTHER PUBLICATIONS

International Preliminary Report on Patentability issued in application No. PCT/JP2014/075452, dated Apr. 7, 2016 (7 pgs).
(Continued)

*Primary Examiner* — Gilbert Lee
(74) *Attorney, Agent, or Firm* — Hayes Soloway P.C.

(57) ABSTRACT

A fluid is actively taken into sealing faces and discharged from the sealing faces to prevent concentration of sediment causative substances on the sealing faces and prevent generation of sediment while preventing leakage of the fluid taken into the sealing faces to a low pressure fluid side. A fluid circulation groove includes an inlet side section where the fluid comes in from a high pressure fluid side and an outlet side section where the fluid goes out to the high pressure fluid side in one of sealing faces of a pair of sliding parts that slide on each other. The fluid circulation groove is isolated from the low pressure fluid side by a land section. Groove width of the outlet side section of the fluid circulation groove is gradually expended toward an outlet end.

15 Claims, 5 Drawing Sheets

(56) References Cited

U.S. PATENT DOCUMENTS

| | | | |
|---|---|---|---|
| 5,556,111 A | 9/1996 | Sedy | 277/96.1 |
| 5,702,110 A | 12/1997 | Sedy | 277/96.1 |
| 6,575,470 B1 | 6/2003 | Gacek et al. | 277/399 |
| 8,440,295 B2 | 5/2013 | Miyazawa | 428/304.4 |
| 9,279,455 B2 | 3/2016 | Tokunaga | F16C 33/74 |

FOREIGN PATENT DOCUMENTS

| | | | | |
|---|---|---|---|---|
| DE | 1221865 | 7/1966 | | F16J 15/34 |
| JP | S59110959 | 6/1984 | | F16J 15/34 |
| JP | S60167861 | 11/1985 | | F16J 15/34 |
| JP | H01133572 | 9/1989 | | F16J 15/34 |
| JP | H07180772 | 7/1995 | | F16J 15/34 |
| JP | H07224948 | 8/1995 | | F16J 15/34 |
| JP | H09503276 | 3/1997 | | F16J 15/34 |
| WO | WO9506832 | 3/1995 | | F16J 15/34 |
| WO | WO0034697 | 6/2000 | | F16J 15/34 |

OTHER PUBLICATIONS

International Search Report and Written Opinion issued in application No. PCT/JP2014/075452, dated Dec. 22, 2014 (10 pgs).
Chinese Office Action issued in application No. 201480038920.0, dated Jul. 22, 2016 (16 pgs).

\* cited by examiner (a)

(b)

(c)

(d)

(e)

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In a mechanical seal serving as one example of the sliding parts, performances thereof are evaluated by a leakage amount, a wear amount, and torque. In the prior art, the performances are enhanced by optimizing sliding material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

Under such circumstances, for example, in a mechanical seal of a water pump used for cooling a water cooling type engine, the present inventor confirmed that over time, LLC additive agents serving as a kind of an antifreeze such as silicate and phosphate (hereinafter, referred to as the "sediment causative substances") are concentrated on sealing faces, sediment is generated, and there is a fear that functions of the mechanical seal are lowered. This generation of the sediment is thought to be a phenomenon that is similarly generated in a mechanical seal of a device in which chemicals and oil are used.

In the conventional mechanical seal, a mechanical seal in which a fluid introduction groove for forming a fluid layer on a sealing face is formed in order to prevent generation of wear and burnout due to friction heat generation of the sealing face is known (for example, refer to Patent Citations 1, 2, 3). However, a mechanical seal to offer a measure for preventing generation of sediment on a sealing face in addition to reduction in leakage and wear is not proposed in a current situation.

CITATION LIST

Patent Document

Patent Citation 1: JP7-180772 A
Patent Citation 2: JP7-224948 A
Patent Citation 3: U.S. Pat. No. 5,498,007 A

SUMMARY OF INVENTION

Technical Problem

FIG. 5 shows a result of analyzing a flow of a fluid on sealing faces according to the prior art. With reference to FIG. 5, problems of the prior art in which a fluid introduction groove 51 is formed for forming a fluid layer on a sealing face S of one sliding part 50 will be described.

In FIG. 5, the sealing face S of the one sliding part 50 is shown to face the upper side of the paper plane, and a sealing face of an opposing sliding part 60 is shown to face the lower side of the paper plane. The sealing face of the opposing sliding part 60 is rotated anti-clockwise as shown by an arrow.

The fluid introduction groove 51 is formed by an inlet section 52, an outlet section 53, and a communication section 54. In a plan view of the sealing face S, the width of the fluid introduction groove 51 is fixed, and an inlet end 52a of the inlet section 52 and an outlet end 53a of the outlet section 53 linearly intersect at fixed angles with respective tangent lines of an annular sealing face side wall 55.

The fluid introduced from the inlet section 52 of the fluid introduction groove 51 by relative sliding on the opposing sliding part is discharged from the outlet section 53. However, a stagnation point of the flow is formed on the side of the sealing face side wall 55 in the vicinity of the outlet end 53a. Therefore, the discharged fluid 56 goes around so as to be attached to the sealing face side wall 55 as shown by dotted lines (bold lines), and repeats a behavior to come into the fluid introduction groove from an inlet section of a next fluid introduction groove on the downstream side. Through repetition of such a behavior, the fluid is gradually concentrated to finally become a sticky paste form, and attached and accumulated onto an interior of the fluid introduction groove. As a result, incoming of a new fluid to the interior of the fluid introduction groove is inhibited and the sealing face S cannot be lubricated.

It should be noted that a new fluid 57 shown by solid lines (thin lines) is also introduced to the inlet section 52 in addition to the re-introduced fluid 56 shown by the dotted lines. According to the present analysis result, it becomes clear that this new fluid 57 is introduced from the direction (axial direction) substantially orthogonal to the sealing face S along the sealing face side wall 55.

An objective of the present invention is to provide sliding parts by which a sealing function of sealing faces can be maintained for a long time by actively taking a fluid into the sealing faces and discharging the fluid from the sealing faces so as to prevent concentration of sediment causative substances on the sealing faces and hence prevent generation of sediment while preventing leakage of the fluid taken into the sealing faces to a low pressure fluid side.

Solution to Problem

In order to achieve the foregoing objective, a first aspect of the present invention is a pair of sliding parts comprising sealing faces that relatively slide on each other, characterized in that a fluid circulation groove including an inlet side section where a fluid comes in from a high pressure fluid side and an outlet side section where the fluid goes out to the high pressure fluid side is provided in one of the sealing faces, the fluid circulation groove is isolated from a low pressure fluid side by a land section, and groove width of the outlet side section of the fluid circulation groove is gradually expanded toward an outlet end.

According to this aspect, no stagnation is formed in the vicinity of the outlet end of the outlet side section of the fluid circulation groove, and a sealed fluid flows as a uniform streamline-shape flow from the vicinity of the outlet end toward the downstream side while receiving centrifugal force. Thus, the sealed fluid is not attached to a side wall on the outer peripheral side of the sealing face S but moved to the downstream side away from the side wall, and the flow of the sealed fluid discharged from the fluid circulation groove on the upstream side goes around a position away from an inlet end of a fluid circulation groove on the downstream side in the radial direction, and does not flow into the fluid circulation groove on the downstream side again.

Therefore, unlike the prior art, the phenomenon that the sealed fluid discharged from the fluid circulation groove on the upstream side flows into the fluid circulation groove on the downstream side again and by repeating this, the sealed fluid is gradually concentrated to finally become a sticky paste form and attached and accumulated onto an interior of the fluid circulation groove is not generated. As a result, the fluid circulation groove is always held in a clean state, so that lubricity of the sealing face can be maintained in a preferable state.

A second aspect of the sliding parts of the present invention relates to the first aspect, characterized in that groove width of the inlet side section of the fluid circulation groove is gradually expanded toward an inlet end.

According to this aspect, no stagnation of the flow is formed in the vicinity of the inlet end of the inlet side section of the fluid circulation groove, so that the fluid efficiently flows into the inlet side section as a uniform flow.

A third aspect of the sliding parts of the present invention relates to the first aspect, characterized in that both side walls of a groove in the outlet side section of the fluid circulation groove are expanded in a streamline shape toward the outlet end in a plan view of the sealing face.

A fourth aspect of the sliding parts of the present invention relates to the first aspect, characterized in that both side walls of a groove in the inlet side section of the fluid circulation groove are expanded in a streamline shape toward the inlet end in a plan view of the sealing face.

According to these aspects, stagnation formation in the vicinity of the outlet end of the outlet side section of the fluid circulation groove and in the vicinity of the inlet end of the inlet side section is furthermore prevented, and a uniform streamline-shape flow can be furthermore facilitated.

A fifth aspect of the sliding parts of the present invention relates to the third or fourth aspect, characterized in that the streamline shape of both the side walls of the groove in each of the outlet side section and the inlet side section is created by arcs in contact with extension lines of both the side walls of the groove in each of the outlet side section and the inlet side section in a plan view of the sealing face.

According to this aspect, the streamline shape of both the side walls of the groove in each of the outlet side section and the inlet side section can be easily formed.

A sixth aspect of the sliding parts of the present invention relates to any of the first to fifth aspects, characterized in that a bottom wall of the groove in the outlet side section or the inlet side section is formed to be deep in a streamline shape toward an end of the groove.

According to this aspect, a uniform streamline-shape flow of the sealed fluid from the vicinity of the outlet end toward the downstream side and an inflow of a new sealed fluid from the vicinity of the inlet end are furthermore facilitated.

A seventh aspect of the sliding parts of the present invention relates to any of the first to sixth aspects, characterized in that a section orthogonal to the longitudinal direction of the bottom wall of the groove in each of the outlet side section and the inlet side section is formed in an arc shape formed by a single arc which is connected to both the side walls of the groove.

According to this aspect, stagnation formation of the fluid flowing through the interior of the groove is furthermore prevented, and a uniform flow can be furthermore facilitated.

An eighth aspect of the sliding parts of the present invention relates to any of the first to sixth aspects, characterized in that the plurality of fluid circulation grooves is provided at equal intervals in the circumferential direction of the sealing face and isolated by the land section.

According to this aspect, the lubricity can be maintained in a preferable state over the entire sealing face.

A ninth aspect of the sliding parts of the present invention relates to any of the first to eighth aspects, characterized in that in a case where the sealing face is formed in an annular shape, each of the fluid circulation grooves is formed in a shape substantially symmetric with respect to a radius line of the sealing face in a plan view of the sealing face, and an intersection angle on the high pressure fluid side made by left and right parts of the fluid circulation groove is set within a range from 120° to 180°.

According to this aspect, an inflow of the sealed fluid to the inlet side section and a discharge of the sealed fluid from the outlet side section can be easily performed.

Advantageous Effects of Invention

The present invention exhibits the following superior effects.

(1) Since the groove width of the outlet side section of the fluid circulation groove is gradually expanded toward the outlet end, no stagnation is formed in the vicinity of the outlet end of the outlet side section of the fluid circulation groove, and the sealed fluid flows as a uniform streamline-shape flow from the vicinity of the outlet end toward the downstream side while receiving the centrifugal force. Thus, the sealed fluid is not attached to the side wall on the outer peripheral side of the sealing face S but moved to the downstream side away from the side wall, and the flow of the sealed fluid discharged from the fluid circulation groove on the upstream side goes around the position away from the inlet end of the fluid circulation groove on the downstream side in the radial direction, and does not flow into the fluid circulation groove on the downstream side again.

Therefore, unlike the prior art, the phenomenon that the sealed fluid discharged from the fluid circulation groove on the upstream side flows into the fluid circulation groove on the downstream side again and by repeating this, the sealed fluid is gradually concentrated to finally become a sticky paste form and attached and accumulated onto the interior of the fluid circulation groove is not generated. As a result, the fluid circulation groove is always held in a clean state, so that the lubricity of the sealing face can be maintained in a preferable state.

(2) Since the groove width of the inlet side section of the fluid circulation groove is gradually expanded toward the inlet end, no stagnation of the flow is formed in the vicinity of the inlet end of the inlet side section of the fluid circulation groove, so that the fluid efficiently flows into the inlet side section as a uniform flow.

(3) Since both the side walls of the groove in the outlet side section of the fluid circulation groove are expanded in a streamline shape toward the outlet end and both the side walls of the groove in the inlet side section are expanded in a streamline shape toward the inlet end in a plan view of the sealing face, stagnation formation in the vicinity of the outlet end of the outlet side section of the fluid circulation groove and in the vicinity of the inlet end of the inlet side section is furthermore prevented, and a uniform streamline-shape flow can be furthermore facilitated.

(4) Since the streamline shape of both the side walls of the groove in each of the outlet side section and the inlet side section is created by the arcs in contact with the extension lines of both the side walls of the groove in each of the outlet side section and the inlet side section, the streamline shape of both the side walls of the groove in each of the outlet side section and the inlet side section can be easily formed.

(5) Since the bottom wall of the groove in the outlet side section or the inlet side section is formed to be deep in a streamline shape toward the end of the respective groove, a uniform streamline-shape flow of the sealed fluid from the vicinity of the outlet end toward the downstream side and an inflow of a new sealed fluid from the vicinity of the inlet end are furthermore facilitated.

(6) Since the section orthogonal to the longitudinal direction of the bottom wall of the groove in each of the outlet side section and the inlet side section is formed in an arc shape formed by a single arc which is connected to both the side walls of the groove, stagnation formation of the fluid flowing through the interior of the groove is furthermore prevented, and a uniform flow can be furthermore facilitated.

(7) Since the plurality of fluid circulation grooves is provided at equal intervals in the circumferential direction of the sealing face and isolated by the land section, the lubricity can be maintained in a preferable state over the entire sealing face.

(8) In a case where the sealing face is formed in an annular shape, each of the fluid circulation grooves is formed in a shape substantially symmetric with respect to the radius line of the sealing face in a plan view of the sealing face, and the intersection angle on the high pressure fluid side made by the left and right parts of the fluid circulation groove is set within a range from 120° to 180°. Thus, the inflow of the sealed fluid to the inlet side section and the discharge of the sealed fluid from the outlet side section can be easily performed.

DESCRIPTION OF EMBODIMENTS

Hereinafter, with reference to the drawings, a mode for carrying out the present invention will be described and exemplified based on an embodiment. However, regarding size, material, shape, and relative arrangement of constituent parts described in the embodiment, and the like, there is no intention to limit the scope of the present invention only to those unless specifically and clearly described.

First Embodiment

With reference to FIGS. 1 to 4, sliding parts according to a first embodiment of the present invention will be described.

It should be noted that in the following embodiment, a mechanical seal serving as one example of the sliding parts will be described as an example. In the description, an outer peripheral side of the sliding parts that form the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around.

Figure 1:
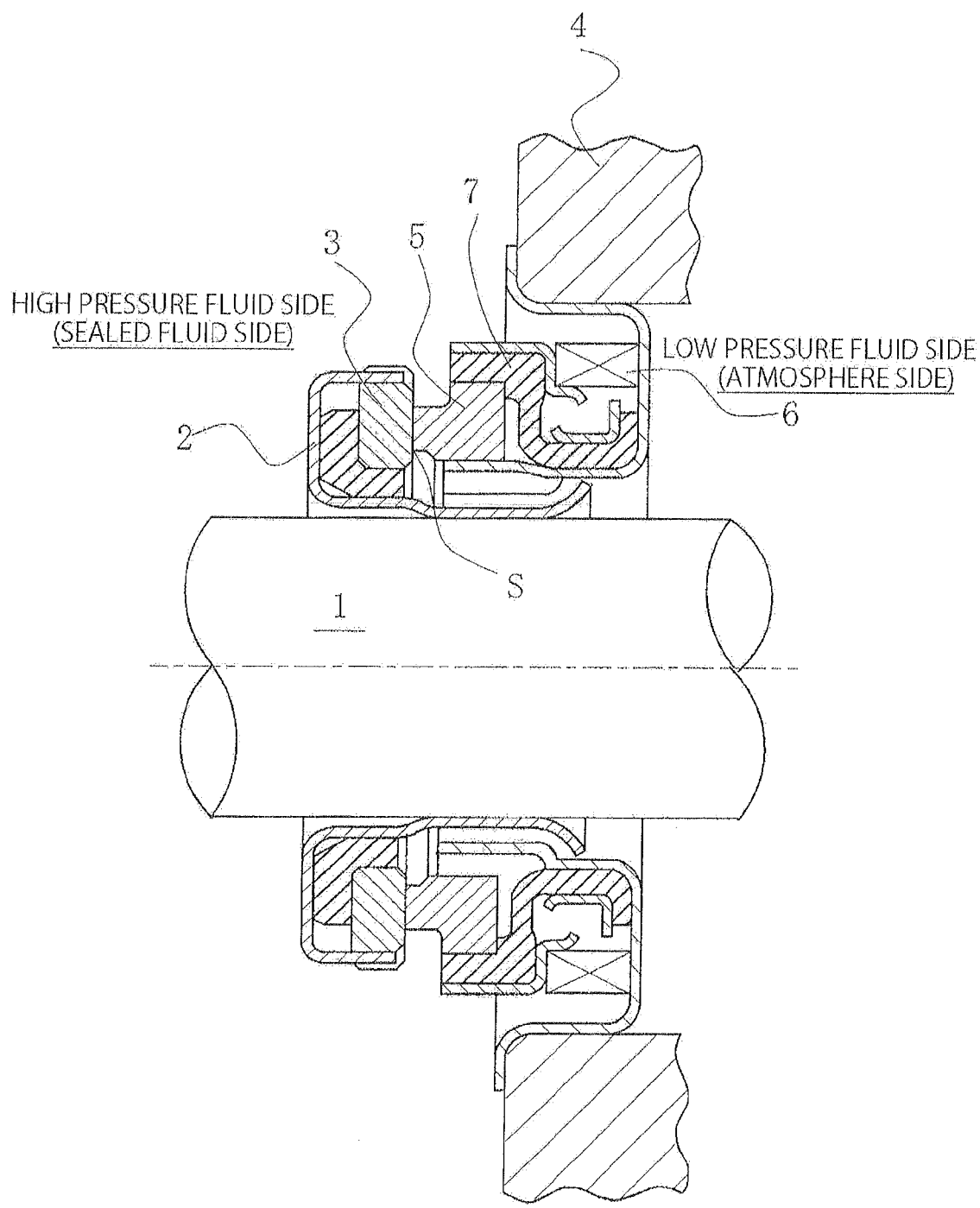
FIG. 1 is a vertically sectional view showing one example of a mechanical seal according to a first embodiment of the present invention.

FIG. 1 is a vertically sectional view showing one example of the mechanical seal that is an inside mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 serving as one of the sliding parts is provided via a sleeve 2 in a state that the rotating ring can be rotated integrally with this rotating shaft 1, an annular stationary ring 5 serving as the other sliding part is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias the stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

It should be noted that although FIG. 1 shows a case where the sealing face width of the rotating ring 3 is greater than the sealing face width of the stationary ring 5, the present invention is not limited to this but can be applied to an opposite case as a matter of course.

Figure 2:
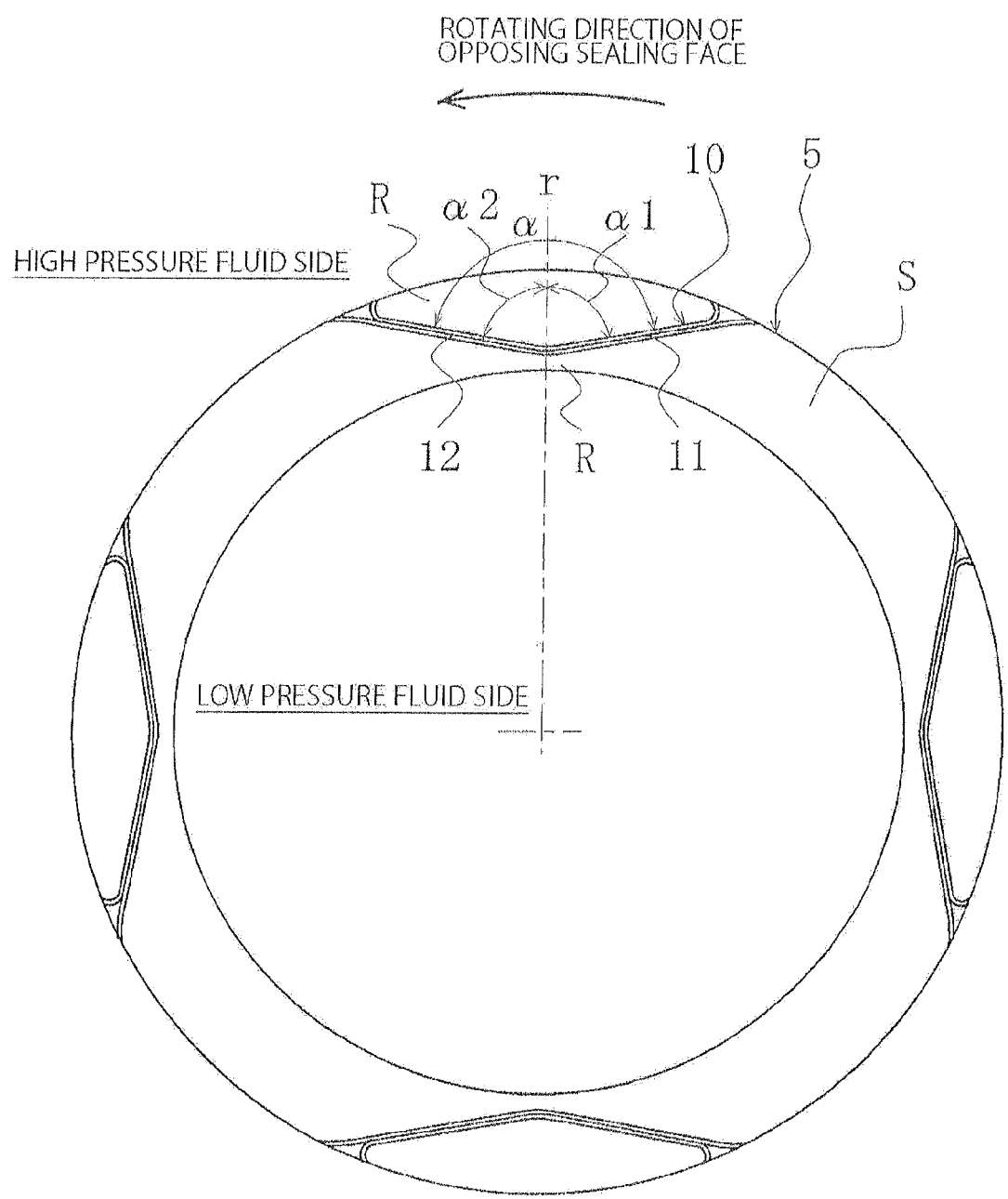
FIG. 2 is a plan view showing one example of a sealing face of a sliding part according to the first embodiment of the present invention.
Figure 3:
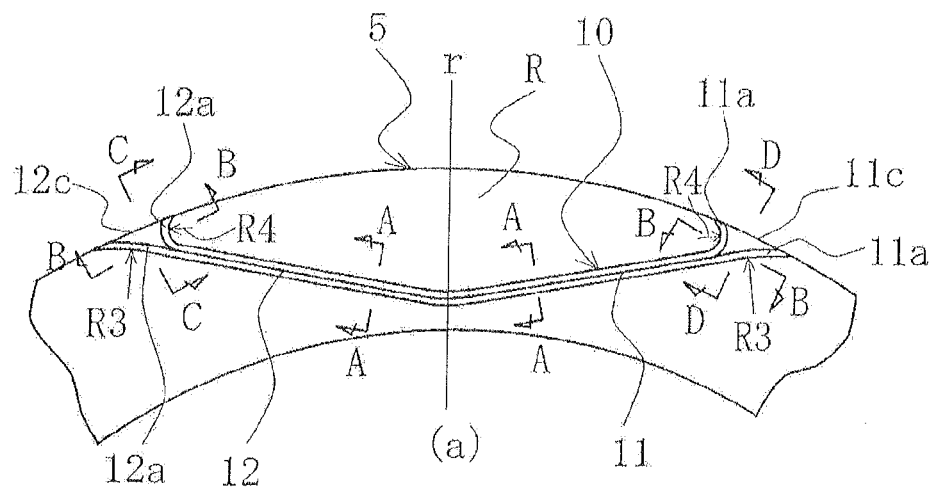
FIG. 3(a) is an enlarged plan view of a part of a fluid circulation groove.
FIG. 3(b) is an A-A sectional view.
FIG. 3(c) is a B-B sectional view.
FIG. 3(d) is a C-C sectional view.
FIG. 3(e) is a D-D sectional view.
Figure 3:
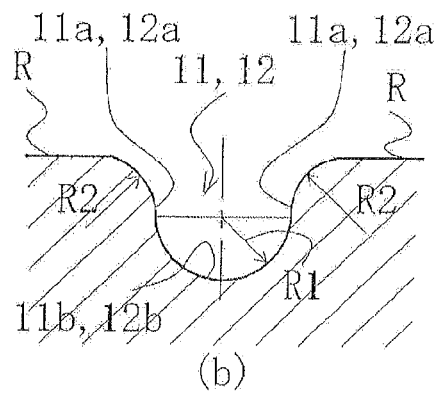
Figure 3:
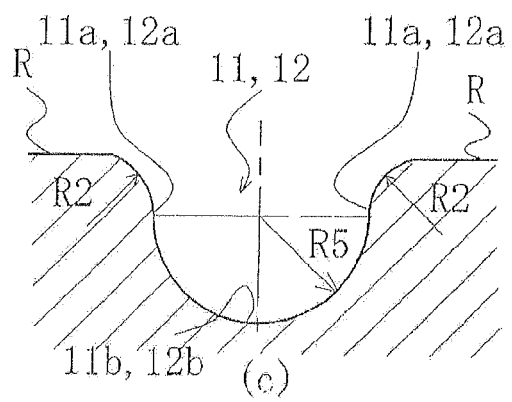
Figure 3:
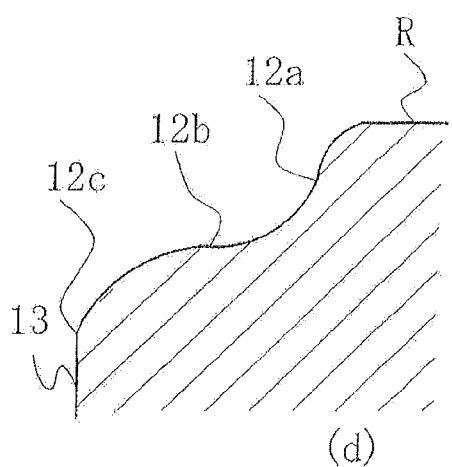
Figure 3:
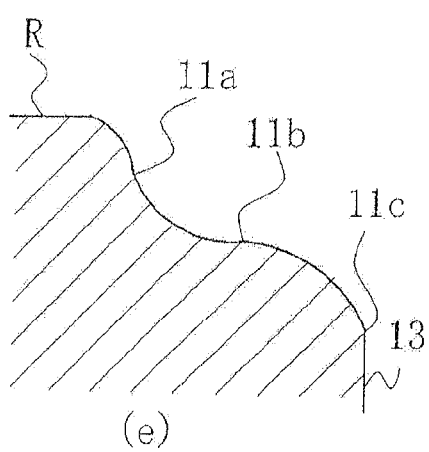

FIG. 2 shows the sealing face of the sliding part according to the first embodiment of the present invention. A case where fluid circulation grooves are formed on the sealing face of the stationary ring 5 of FIG. 1 will be described as an example.

It should be noted that a case where the fluid circulation grooves are formed on the sealing face of the rotating ring 3 is basically similar. However, in that case, the fluid circulation grooves are only required to communicate with the sealed fluid side and hence not required to be provided up to the outer peripheral side of the sealing face.

In FIG. 2, the outer peripheral side of the sealing face S of the stationary ring 5 serves as the high pressure fluid side (sealed fluid side), the inner peripheral side serves as the low pressure fluid side such as the atmosphere side, and the opposing sealing face is rotated anti-clockwise.

On the sealing face of the stationary ring 5, four fluid circulation grooves 10 that communicate with the high pressure fluid side and are isolated from the low pressure fluid side by a smooth section R (sometimes referred to as the "land section" in the present invention) of the sealing face S are provided at equal intervals in the circumferential direction.

Each of the fluid circulation grooves 10 includes an inlet side section 11 where the sealed fluid comes in from the high pressure fluid side and an outlet side section 12 where the fluid goes out to the high pressure fluid side.

The fluid circulation groove 10 plays a role of actively introducing the sealed fluid onto the sealing face from the high pressure fluid side and discharging the fluid in order to prevent concentration of the fluid containing corrosion products on the sealing face S. The inlet side section 11 and the outlet side section 12 are formed in such a manner that the sealed fluid is easily taken onto the sealing face and discharged in accordance with the rotating direction of the opposing sealing face, while the fluid circulation groove is isolated from the low pressure fluid side by the land section R in order to reduce leakage.

In the present example, the fluid circulation groove 10 is formed in a shape substantially left-right symmetric with respect to a radius line r of the sealing face S in a plan view of the sealing face S, and an intersection angle α on the high pressure fluid side made by left and right parts of the fluid circulation groove 10, that is, the inlet side section 11 and the outlet side section 12 is set within a range from 120° to 180°.

It should be noted that the shape of the fluid circulation groove 10 in a plan view is not necessarily a shape left-right symmetric with respect to the radius line r but an intersection angle α1 of the inlet side section 11 may be larger than an intersection angle α2 of the outlet side section 12 and vice versa.

In the present specification, the phrase "left-right symmetric" indicates a range of α1=α2±5°.

A preferable range of the intersection angle α is a range from 120° to 180°. However, the present invention is not limited to a range from 120° to 180°.

Further, the shape of the fluid circulation groove 10 in a plan view may be formed in a curved shape (such as an arc shape) as a whole without having a linear part.

The width and the depth of the fluid circulation groove 10 may be set to be optimal in accordance with pressure, a type (viscosity), and the like of the sealed fluid.

The fluid circulation groove 10 shown in FIG. 2 is left-right symmetric, and the intersection angle α is as large as 160°. Thus, an inflow of the sealed fluid to the inlet side section 11 and a discharge of the sealed fluid from the outlet side section 12 are easily performed.

FIG. 3(a) is an enlarged plan view of a part of the fluid circulation groove 10. The fluid circulation groove 10 will be described in detail with reference to FIGS. 3(a) to 3(d).

A groove in each of the inlet side section 11 and the outlet side section 12 of the fluid circulation groove 10 includes both side walls 11a (12a), 11a (12a), and a bottom wall 11b (12b) as shown in FIG. 3(b). A section orthogonal to the longitudinal direction of the groove of the bottom wall 11b (12b) is formed in an arc shape formed by a single arc which is connected to both the side walls 11a (12a), 11a (12a). That is, the bottom wall 11b (12b) is formed in a single arc shape of a radius R1. Both the side walls 11a (12a), 11a (12a) and the land section R are connected by an arc shape of a radius R2.

As shown in FIG. 3(a), the groove width of the outlet side section 12 is gradually expanded toward an outlet end 12c.

In the present example, expansion of the groove width of the outlet side section 12 toward the outlet end 12c is done by expanding both the side walls 12a, 12a of the groove in a streamline shape toward the outlet end 12c in a plan view of the sealing face S.

The streamline shape is created by arcs R3, R4 in contact with extension lines of both the side walls 12a, 12a of the groove in the outlet side section 12. The arc R3 in contact with the extension line of the side wall on the downstream side is larger than the arc R4 in contact with the extension line of the side wall on the upstream side.

The gradual expansion of the groove width of the outlet side section 12 toward the outlet end 12c is a first aspect part of the present invention, and technical significance thereof will be described in detail later.

In accordance with the expansion of both the side walls 12a, 12a of the groove in the outlet side section 12 in a streamline shape toward the outlet end 12c, the bottom wall 12b is also formed in a shape corresponding to the expansion.

Specifically, as shown in FIG. 3(c) serving as a sectional view of the vicinity of the outlet end 12c, an expanded part of the bottom wall 12b is formed in an arc shape of a radius larger than the radius R1, that is, a radius R5 with which both the expanded side walls 12a, 12a can be connected.

As shown in FIG. 3(d), the bottom wall 12b of the groove in the outlet side section 12 is formed to be deep in a streamline shape toward the end 12c, and formed in a shape to be smoothly connected to a side wall 13 on the outer peripheral side of the sealing face S of the stationary ring 5.

Next, the shape of the groove in the inlet side section 11 will be described.

The planar shape of the groove in the inlet side section 11 is formed in a shape substantially symmetric to the groove in the outlet side section 12 with respect to the radius line r of the sealing face S. The sectional shape of the groove is the same as the groove in the outlet side section 12.

As shown in FIG. 3(a), the groove width of the inlet side section 11 is gradually expanded toward an inlet end 11c.

In the present example, expansion of the groove width of the inlet side section 11 toward the inlet end 11c is done by expanding both the side walls 11a, 11a of the groove in a streamline shape toward the inlet end 11c in a plan view of the sealing face S.

The streamline shape is created by arcs R3, R4 in contact with extension lines of both the side walls 11a, 11a of the groove in the inlet side section 11. The arc R3 in contact with the extension line of the side wall on the upstream side is larger than the arc R4 in contact with the extension line of the side wall on the downstream side.

The gradual expansion of the groove width of the inlet side section 11 toward the inlet end 11c is a second aspect part of the present invention, and technical significance thereof will be described in detail later.

In accordance with the expansion of both the side walls 11a, 11a of the groove in the inlet side section 11 in a streamline shape toward the inlet end 11c, the bottom wall 11b is also formed in a shape corresponding to the expansion.

Specifically, as shown in FIG. 3(c) serving as a sectional view of the vicinity of the inlet end 11c, an expanded part of the bottom wall 11b is formed in an arc shape of a radius larger than the radius R1, that is, a radius R5 with which both the expanded side walls 11a, 11a can be connected.

As shown in FIG. 3(e), the bottom wall 11b of the groove in the inlet side section 11 is formed to be deep in a streamline shape toward the end 11c, and formed in a shape to be smoothly connected to the side wall 13 on the outer peripheral side of the sealing face S of the stationary ring 5.

Figure 4:
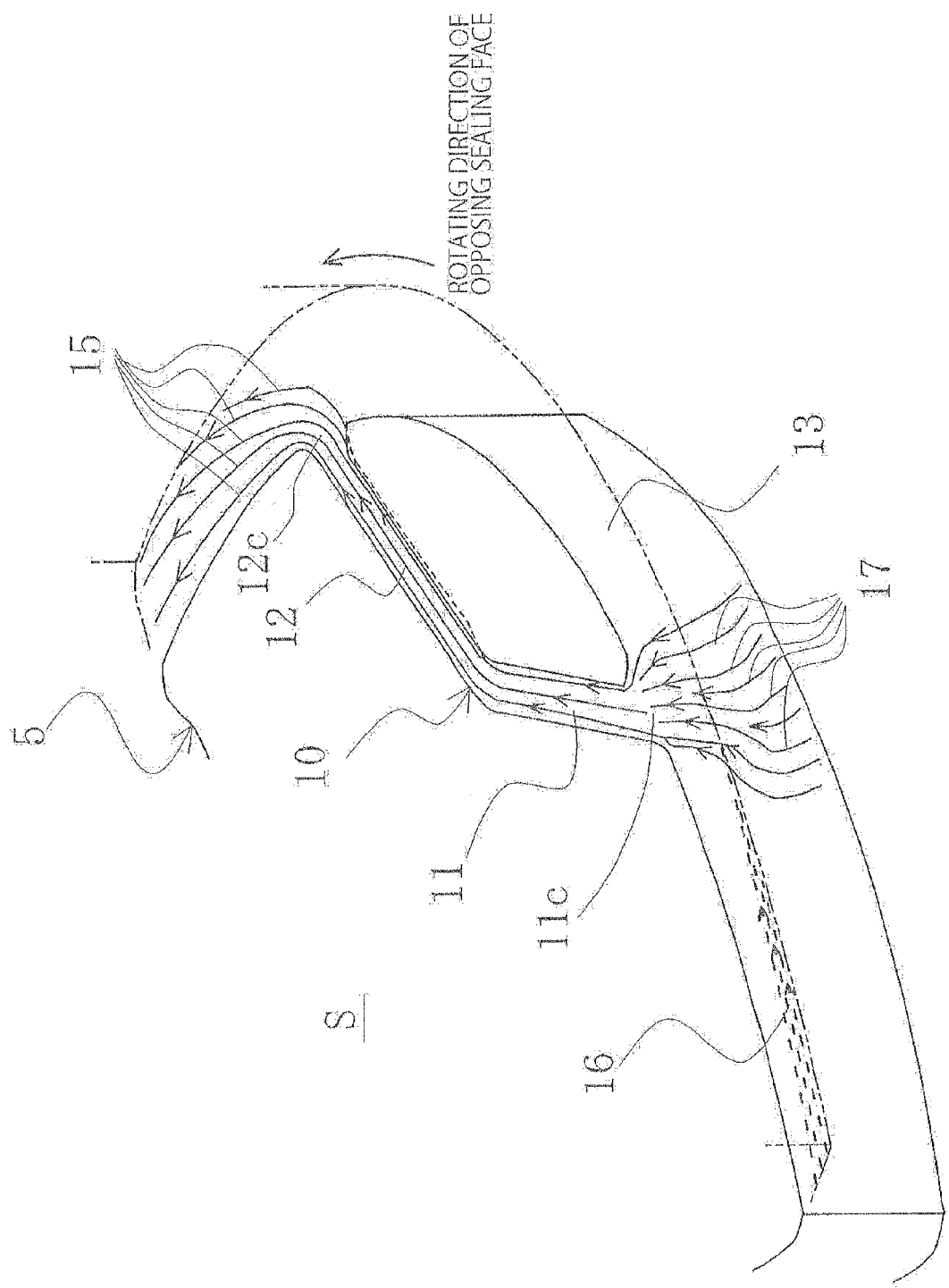
FIG. 4 is a perspective view showing a result of analyzing a flow of a fluid (sealed fluid) on the sealing face of the sliding part according to the first embodiment of the present invention.
Figure 5:
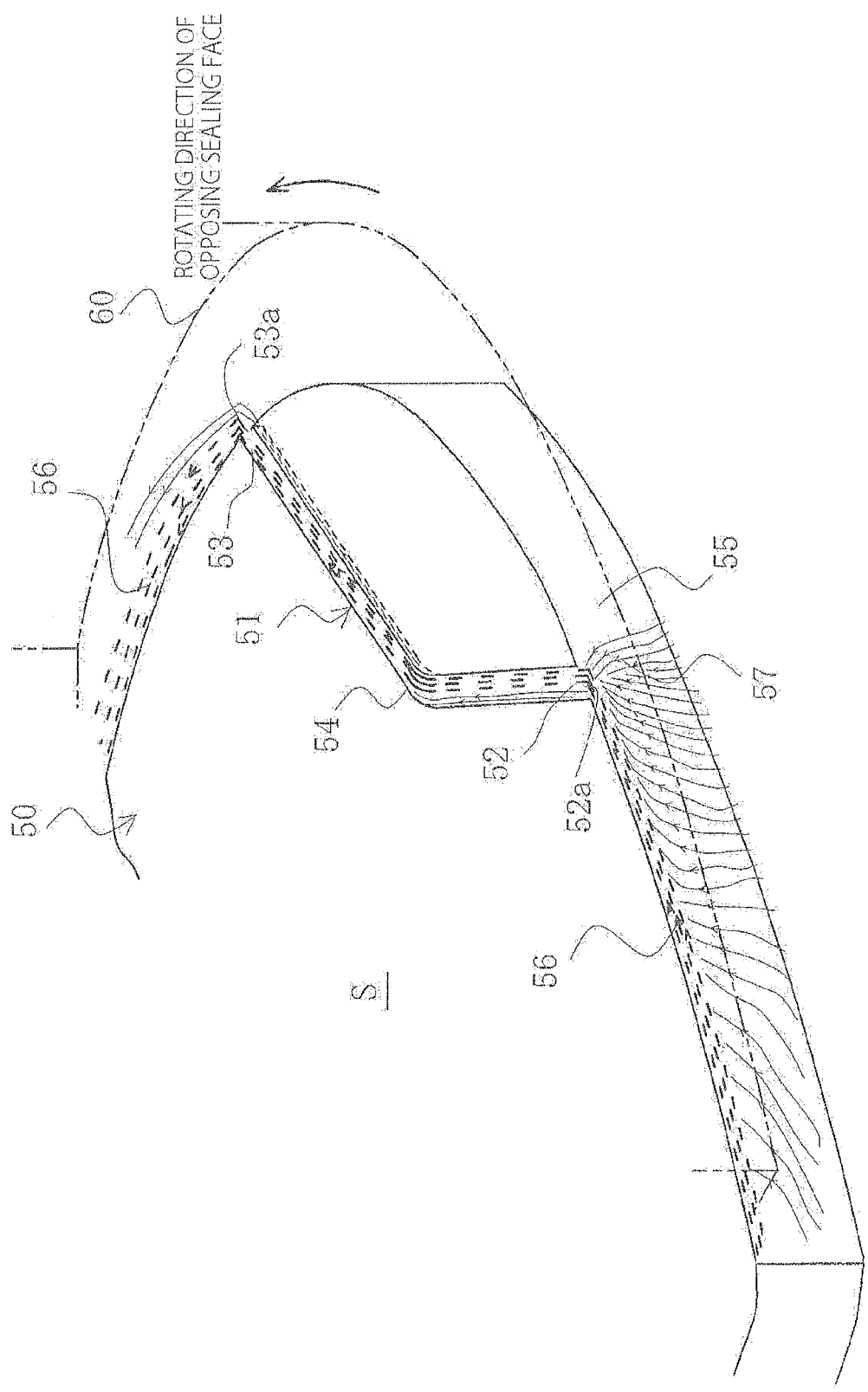
FIG. 5 is a perspective view showing a result of analyzing a flow of a fluid on a sealing face according to the prior art.

FIG. 4 shows a result of analyzing a flow of the fluid on the sealing face according to the first embodiment of the present invention. With reference to FIG. 4, the flow of the sealed fluid on the sealing face S in which the fluid circulation groove 10 is formed in order to form a fluid layer on the sealing face S of the stationary ring 5 serving as one of the sliding parts will be described. In FIG. 4, the sealing face S of the stationary ring 5 is shown to face the upper side of the paper plane, and the sealing face of the rotating ring 3 is shown to face the lower side of the paper plane. The opposing sealing face is rotated anti-clockwise as shown by an arrow.

By relative sliding on the opposing sealing face, the sealed fluid flows into the inlet side section 11 of the fluid circulation groove 10 and is discharged from the outlet side section 12 as shown by solid lines. At the time, since the groove width of the outlet side section 12 is gradually expanded toward the outlet end 12c, no stagnation is formed in the vicinity of the outlet end 12c, and the sealed fluid flows as a uniform streamline-shape flow 15 from the vicinity of the outlet end 12c toward the downstream side while receiving centrifugal force. Therefore, the sealed fluid is not attached to the side wall 13 on the outer peripheral side of the sealing face S but moved to the downstream side away from the side wall 13.

As shown in FIG. 3(d), the bottom wall 12b of the groove in the outlet side section 12 is formed to be deep in a streamline shape toward the end 12c, and formed in a shape to be smoothly connected to the side wall 13 on the outer peripheral side of the sealing face S of the stationary ring 5. Thus, the uniform streamline-shape flow 15 of the sealed fluid from the vicinity of the outlet end 12c toward the downstream side is furthermore facilitated.

In FIG. 4, a flow 16 shown by broken lines indicates a flow of the sealed fluid discharged from the fluid circulation groove 10 on the upstream side. In FIG. 4, for convenience, the same fluid circulation groove 10 is used for description. However, in a case where the plurality of fluid circulation grooves 10 is arranged in the circumferential direction, the sealed fluid discharged from the fluid circulation groove 10 on the upstream side flows to the fluid circulation groove 10 on the downstream side.

Now, the flow 16 of the sealed fluid discharged from the fluid circulation groove 10 on the upstream side goes around a position away from the inlet end 11a of the fluid circulation groove 10 on the downstream side in the radial direction, and does not flow into the fluid circulation groove 10 on the downstream side again. This is because the sealed fluid discharged from the fluid circulation groove 10 on the upstream side is not attached to the side wall 13 on the outer peripheral side of the sealing face S but moved to the downstream side away from the side wall 13.

Therefore, unlike the prior art, the phenomenon that the sealed fluid discharged from the fluid circulation groove on the upstream side flows into the fluid circulation groove on the downstream side again and by repeating this, the sealed fluid is gradually concentrated to finally become a sticky paste form and attached and accumulated onto an interior of the fluid circulation groove is not generated. As a result, the fluid circulation groove 10 is always held in a clean state, so that lubricity of the sealing face S can be maintained in a preferable state.

It is found that in the vicinity of the inlet end 11c of FIG. 4, as shown by a flow 17 along the axial direction of the side wall 13, an inflow of a new sealed fluid to the fluid circulation groove is performed mainly from the axial direction. At the time, since the groove width of the inlet side section 11 is gradually expanded toward the inlet end 11c, no stagnation of the flow is formed in the vicinity of the inlet end 11c, so that the fluid efficiently flows into the inlet side section 11 as a uniform flow.

In the present example, as shown in FIG. 3(e), the bottom wall 11b of the groove in the inlet side section 11 is formed to be deep in a streamline shape toward the end 11c, and formed in a shape to be smoothly connected to the side wall 13 on the outer peripheral side of the sealing face S of the stationary ring 5. Thus, an inflow of a new sealed fluid to the fluid circulation groove 10 is furthermore facilitated.

As shown in FIG. 4, the section orthogonal to the longitudinal direction of the groove of the bottom wall 11b (12b) of the fluid circulation groove 10 is formed in an arc shape formed by a single arc which is connected to both the side walls 11a (12a), 11a (12a). Thus, stagnation formation of the fluid flowing through the interior of the groove is furthermore prevented, and a uniform flow is furthermore facilitated.

As described above, according to the configuration of the first embodiment, by actively guiding the fluid to the sealing faces and discharging the fluid by the fluid circulation groove 10, the fluid between the sealing faces is circulated, concentration of the fluid containing sediment causative substances and retention of wear powder and foreign substances are prevented, and hence formation of sediment is prevented, so that a sealing function of the sealing faces can be maintained for a long time.

Specific description will be given below.

(1) Since the groove width of the outlet side section 12 is gradually expanded toward the outlet end 12c, no stagnation is formed in the vicinity of the outlet end 12c, and the sealed fluid flows as the uniform streamline-shape flow 15 from the vicinity of the outlet end 12c toward the downstream side while receiving the centrifugal force. Therefore, the sealed fluid is not attached to the side wall 13 on the outer peripheral side of the sealing face S but moved to the downstream side away from the side wall 13. The flow 16 of the sealed fluid discharged from the fluid circulation groove 10 on the upstream side goes around the position away from the inlet end 11a of the fluid circulation groove 10 on the downstream side in the radial direction, and does not flow into the fluid circulation groove 10 on the downstream side again.

Therefore, unlike the prior art, the phenomenon that the sealed fluid discharged from the fluid circulation groove on the upstream side flows into the fluid circulation groove on the downstream side again and by repeating this, the sealed fluid is gradually concentrated to finally become a sticky paste form and attached and accumulated onto the interior of the fluid circulation groove is not generated. As a result, the fluid circulation groove 10 is always held in a clean state, so that the lubricity of the sealing face S can be maintained in a preferable state.

(2) Since the groove width of the inlet side section 11 is gradually expanded toward the inlet end 11c, no stagnation of the flow is formed in the vicinity of the inlet end 11c, so that the fluid efficiently flows into the inlet side section 11 as the uniform flow 17.

(3) The bottom wall 12b of the groove in the outlet side section 12 is formed to be deep in a streamline shape toward the end 12c, and formed in a shape to be smoothly connected to the side wall 13 on the outer peripheral side of the sealing face S of the stationary ring 5. Thus, the uniform streamline-shape flow 15 from the vicinity of the outlet end 12c of the sealed fluid toward the downstream side is furthermore facilitated.

(4) The bottom wall 11b of the groove in the inlet side section 11 is formed to be deep in a streamline shape toward the end 11c, and formed in a shape to be smoothly connected to the side wall 13 on the outer peripheral side of the sealing face S of the stationary ring 5. Thus, an inflow of anew sealed fluid to the fluid circulation groove 10 is furthermore facilitated.

(5) The section orthogonal to the longitudinal direction of the groove of the bottom wall 11b (12b) of the fluid circulation groove 10 is formed in an arc shape formed by a single arc which is connected to both the side walls 11a (12a), 11a (12a). Thus, stagnation formation of the fluid flowing through the interior of the groove is furthermore prevented, and a uniform flow is furthermore facilitated.

(6) Since the plurality of fluid circulation grooves 10 is provided at equal intervals in the circumferential direction of the sealing face and isolated by the land section R, the lubricity can be maintained in a preferable state over the entire sealing face.

(7) In a case where the sealing face S is formed in an annular shape, each of the fluid circulation grooves 10 is formed in a shape substantially symmetric with respect to the radius line of the sealing face S in a plan view of the sealing face S, and the intersection angle on the high pressure fluid side made by the left and right parts of the fluid circulation groove 10 is set within a range from 120° to 180°. Thus, the inflow of the sealed fluid to the inlet side section and the discharge of the sealed fluid from the outlet side section can be easily performed.

The embodiment of the present invention is described above with the drawings. However, specific configurations are not limited to the embodiment but modifications and additions that are made within the range not departing from the gist of the present invention are also included in the present invention.

For example, although the example that the sliding part is used for any of a pair of rotating and stationary sealing rings in a mechanical seal device is described in the above embodiment, the sliding part can also be utilized as a sliding part of a bearing that slides on a rotating shaft while sealing lubricating oil on one side in the axial direction of a cylindrical sealing face.

For example, although the case where the high-pressure sealed fluid exists on the outer peripheral side is described in the above embodiment, the present invention can also be applied to a case where the high-pressure fluid exists on the inner peripheral side.

For example, the case where the groove width of the outlet side section and the groove width of the inlet side section are gradually expanded toward the respective ends on the outer peripheral side in the fluid circulation groove is described in the above embodiment. However, it is essential to gradually expand at least the groove width of the outlet side section toward the end on the outer peripheral side and the groove width of the inlet side section is gradually expanded toward the end on the outer peripheral side as a supplementary matter.

For example, although the case where the four fluid circulation grooves are provided at equal intervals in the circumferential direction is described in the above embodiment, the present invention is not limited to this but one or more fluid circulation grooves may be provided.

REFERENCE SIGNS LIST

1 Rotating shaft
2 Sleeve
3 Rotating ring
4 Housing
5 Stationary ring
6 Coiled wave spring
7 Bellows
10 Fluid circulation groove
11 Inlet side section
12 Outlet side section
13 Side wall
15 Uniform flow in vicinity of outlet end
16 Flow of sealed fluid discharged from fluid circulation groove
17 Uniform flow in vicinity of inlet end
R Land section
S Sealing face

The invention claimed is:

1. A pair of sliding parts comprising sealing faces that relatively slide on each other, wherein:
   a fluid circulation groove including an inlet side section where a fluid comes in from a high pressure fluid side and an outlet side section where the fluid goes out to the high pressure fluid side is provided in one of the sealing faces;
   the fluid circulation groove extends in a line shape drawn by one stroke in a plan view of the sealing face and is isolated from a low pressure fluid side by a land section;
   the fluid circulation groove is defined at least by a pair of side walls which directly face to each other; and
   at least upstream one of the side walls of the outlet side section of the fluid circulation groove has an arc shape in a plan view of the sealing face in such a manner that a distance between the side walls of the outlet side section of the fluid circulation groove is gradually increased toward an outlet end of the outlet side section.

2. The sliding parts as set forth in claim 1, wherein:
   at least downstream one of the side walls of the inlet side section of the fluid circulation groove has an arc shape in the plan view of the sealing face in such a manner that a distance between the side walls of the inlet side section of the fluid circulation groove is gradually increased toward an inlet end of the inlet side section.

3. The sliding parts as set forth in claim 2, wherein:
   downstream one of the side walls of the inlet side section of the fluid circulation groove has an arc shape in a plan view of the sealing face in such a manner that the distance between the side walls of the inlet side section of the fluid circulation groove is gradually further increased toward the inlet end of the inlet side section.

4. The sliding parts as set forth in claim 3, wherein:
   the arc shape of the upstream one of the side walls of the inlet side section has a radius that is larger than the arc shape of the downstream one of the side walls of the inlet side section does.

5. The sliding parts as set forth in claim 2, wherein:
   upstream one of the side walls of the outlet side section of the fluid circulation groove has an arc shape in a plan view of the sealing face in such a manner that the distance between the side walls of the outlet side section of the fluid circulation groove is gradually further increased toward the outlet end of the outlet side section; and
   downstream one of the side walls of the inlet side section of the fluid circulation groove has an arc share in a plan view of the sealing face in such a manner that the distance between the side walls of the inlet side section of the fluid circulation groove is gradually further increased toward the inlet end of the inlet side section.

6. The sliding parts as set forth in claim 5, wherein:
   the arc shape of the downstream one of the side walls of the outlet side section has a radius that is larger than the arc shape of the upstream one of the side walls of the outlet side section does; and the arc shape of the upstream one of the side walls of the inlet side section has a radius that is larger than the arc shape of the downstream one of the side walls of the inlet side section does.

7. The sliding parts as set forth in claim 6, wherein:
the plurality of fluid circulation grooves is provided at equal intervals in the circumferential direction of the sealing face and isolated from each other by the land section; and each of the fluid circulation grooves is formed in a V-shape substantially symmetric with respect to a radius line of the sealing face in the plan view of the sealing face, and an intersection angle on the high pressure fluid side made by the V-shape is set to 160°.

8. The sliding parts as set forth in claim 6, wherein:
the plurality of fluid circulation grooves is provided at equal intervals in the circumferential direction of the sealing face and isolated from each other by the land section; and each of the fluid circulation grooves is formed in a straight line shape in the plan view of the sealing face.

9. The sliding parts as set forth in claim 1, wherein:
upstream one of the side walls of the outlet side section of the fluid circulation groove has an arc shape in a plan view of the sealing face in such a manner that the distance between the side walls of the outlet side section of the fluid circulation groove is gradually further increased toward the outlet end of the outlet side section.

10. The sliding parts as set forth in claim 9, wherein:
the arc shape of the downstream one of the side walls of the outlet side section has a radius that is larger than the arc shape of the upstream one of the side walls of the outlet side section does.

11. The sliding parts as set forth in claim 1, wherein:
at least one of the outlet side section and the inlet side section of the fluid circulation groove is formed to become deeper in a curved line shape toward an end of the fluid circulation groove.

12. The sliding parts as set forth in claim 1, wherein:
a section orthogonal to the longitudinal direction of the bottom wall of the groove in each of the outlet side section and the inlet side section is formed in an arc shape formed by a single arc which is connected to both the side walls of the groove.

13. The sliding parts as set forth in claim 1, wherein:
the plurality of fluid circulation grooves is provided at equal intervals in the circumferential direction of the sealing face and isolated from each other by the land section.

14. The sliding parts as set forth in claim 13, wherein:
each of the fluid circulation grooves is formed in a shape substantially symmetric with respect to a radius line of the sealing face in a plan view of the sealing face, and an intersection angle on the high pressure fluid side made by left and right parts of the fluid circulation groove is set within a range from 120° to 180°.

15. The sliding parts as set forth in claim 14, wherein:
the intersection angle is set to 180°.

* * * * *